(12) United States Patent
Duncan et al.

(10) Patent No.: US 8,754,855 B2
(45) Date of Patent: Jun. 17, 2014

(54) VIRTUAL TOUCHPAD

(75) Inventors: Rick Duncan, Kirkland, WA (US); Tom Alphin, Kirkland, WA (US); David Perry, Lynnwood, WA (US); Chris Devaraj, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 12/163,746

(22) Filed: Jun. 27, 2008

(65) Prior Publication Data

US 2009/0322687 A1 Dec. 31, 2009

(51) Int. Cl.
*G06F 3/041* (2006.01)

(52) U.S. Cl.
USPC .......................................... 345/173

(58) Field of Classification Search
USPC .......................... 345/173; 715/863
See application file for complete search history.

(56) References Cited

U.S. PATENT DOCUMENTS

| | | | |
|---|---|---|---|
| 7,268,772 B2* | 9/2007 | Kawai et al. | 345/173 |
| 2004/0021681 A1* | 2/2004 | Liao | 345/702 |
| 2006/0033724 A1* | 2/2006 | Chaudhri et al. | 345/173 |
| 2006/0066590 A1 | 3/2006 | Ozawa | |
| 2006/0119588 A1 | 6/2006 | Yoon | |
| 2007/0262964 A1 | 11/2007 | Zotov et al. | |
| 2008/0001923 A1* | 1/2008 | Hall et al. | 345/173 |

FOREIGN PATENT DOCUMENTS

| | | |
|---|---|---|
| CN | 1782975 | 6/2006 |
| EP | 1739498 A2 | 3/2007 |
| EP | 1821239 A1 | 8/2007 |
| JP | 7072976 A | 3/1995 |
| JP | 8221204 A | 8/1996 |
| KR | 20-1998-0020202 U | 7/1998 |

OTHER PUBLICATIONS

European Search Report in Application No. 09771216.0/PCT/US2009048969 dated Nov. 25, 2011; 7 pages.

* cited by examiner

*Primary Examiner* — Yong H Sim
(74) *Attorney, Agent, or Firm* — Sung Kim; Leonard Smith; Micky Minhas

(57) ABSTRACT

Embodiments described herein are directed to simultaneously presenting a virtual touchpad and a graphical user interface of an operating system on the same display. A user can interact with the OS using the virtual touchpad, and user touches are read by a touch-screen portion of the display assigned to the touchpad. Touch input software converts touch packets from user touches into data packets relevant to the screen and display resolution of either the display or a portion of the display presenting the OS. Gesture-recognition software applies rules to the converted packets to determine which actions the user meant by the touches. And an application controlling a mouse cursor manipulates the mouse cursor according to the mouse actions.

14 Claims, 4 Drawing Sheets

US 8,754,855 B2

VIRTUAL TOUCHPAD

BACKGROUND

The mouse is a ubiquitous input tool that is easily understood by many people using today's computing devices. For decades, the mouse has remained one of the most popular and input mechanisms for computers. People quickly recognize mouse cursors on screens of computing devices and typically know how to use them. Whether it be a mobile phone, laptop, personal computer, computer tablet, the mouse cursor remains extremely popular for interacting with graphical user interfaces (GUIs).

The traditional mouse is cumbersome in many situations. It generally requires a separate device fit for a hand that needs a planar surface to glide across. As laptops became increasingly popular, touchpads were moved onto the actual computing device. This spares the user from having to use a separate input device to interact with the computing device, but the touchpad requires space on the computing device and is limited to a particular size and area. Modern touchpads only provide a small space for a user to drag a finger or use a stylus, making it somewhat difficult for the user to control a mouse cursor on displays that are much larger in size.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to simultaneously presenting a virtual touchpad and a GUI of an OS on the same display. A user can interact with the OS using the virtual touchpad, which is embodied within a touch-screen portion of the display. User touches are read by the touch-screen portion and digitized by a digitizer. Touch input software converts touch packets from user touches into data packets relevant to the screen and display resolution of either the display or a portion of the display presenting the OS. Gesture-recognition software applies rules to the converted packets to determine which actions the user meant by the touches. Finally, an application controlling a mouse cursor manipulates the mouse cursor according to the mouse actions.

Another aspect of the invention is directed to a GUI on a single display that simultaneously presents a virtual input device and a representation of an OS. A user can interact with the OS using the virtual input device.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Embodiments described herein are directed toward a virtual touchpad that is presented on a touch screen. Using the virtual touchpad, a user can control a mouse cursor on a screen of a computing device. Interaction with the virtual touchpad produces touch-screen input signals that are captured and translated into mouse actions by gesture-recognition software. The OS interprets the mouse signals as if they were received from a traditional mouse or touchpad, thus providing the functionality of a touchpad through a virtual representation of the touchpad.

While a virtual touchpad is described herein, embodiments are not limit thereto. Instead, embodiments fully contemplate virtual renditions of other input devices. For example, a virtual scroll ball, virtual scroll wheel, virtual mouse nub, or other virtual rendition of a device may be represented in some embodiments. For the sake of clarity, only virtual touchpads are described below.

Even though embodiments described herein refer to controlling a mouse cursor with a virtual touchpad, embodiments may also be combined with other touch-screen capabilities. Specifically, the virtual touchpad may be displayed, and provide a tool for controlling a mouse cursor, while the rest of a computing screen may also be sensitive to touches. For example, users may either use the virtual touchpad in the touch-screen portions of a display (described below) to control a mouse cursor or control the mouse cursor by directly touching the cursor presented in the system portion of the display (also described below).

Figure 1:
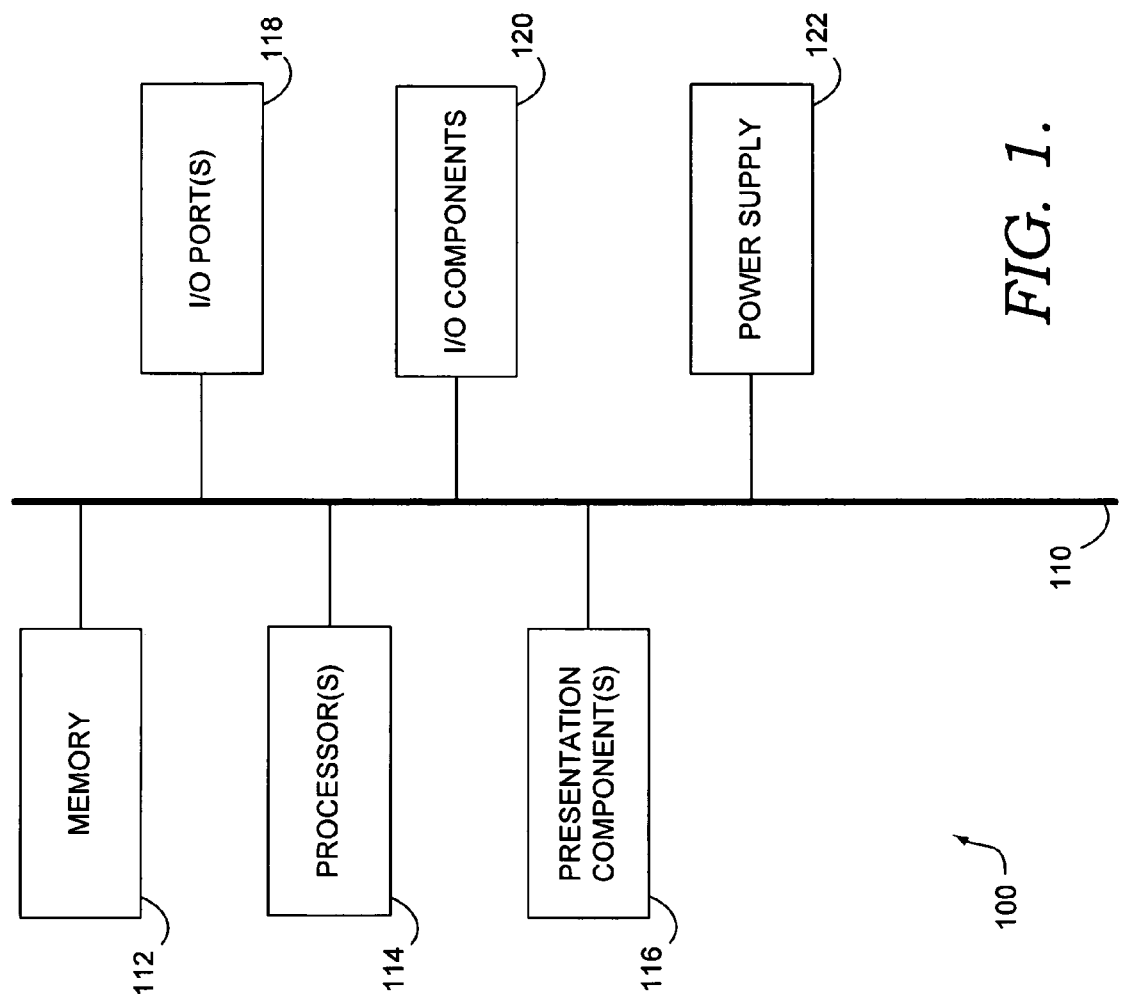
FIG. 1 is a block diagram of an exemplary operating environment for use in implementing an embodiment of the present invention.

Having briefly described a general overview of the embodiments described herein, an exemplary computing device is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that are configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

The components described above in relation to computing device 100 may also be included in a mobile device. A mobile device, as described herein, refers to any type of mobile phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. Embodiments described herein mention to both a computing device and a mobile device. In embodiments, computing devices merely refer to devices that are running applications of which images are captured by the camera in a mobile device.

Computing device 100 includes a touch screen, which one skilled in art will appreciate is a display that can detect the location of touches within a display area. Some embodiments will include a single display with portions of the display allocated to receive touch-screen inputs (referred to herein as "touches"). In other embodiments, the entire display area is capable of receiving touches from a user, such as from a finger or stylus. Touch screens can be implemented by adding resistive, capacitive, infrared, or similar panels to a typical computing device screen—e.g., liquid crystal display (LCD), light emitting diode (LED), organic LED (OLED), etc. Touch screens may alternatively incorporate strain gauge configurations or optical imaging, dispersive signal, surface acoustic wave, or other technology for capturing touches. The above lists are not exhaustive, as one skilled in the art will understand that numerous other panels and technologies may be used to capture touches.

Figure 2:
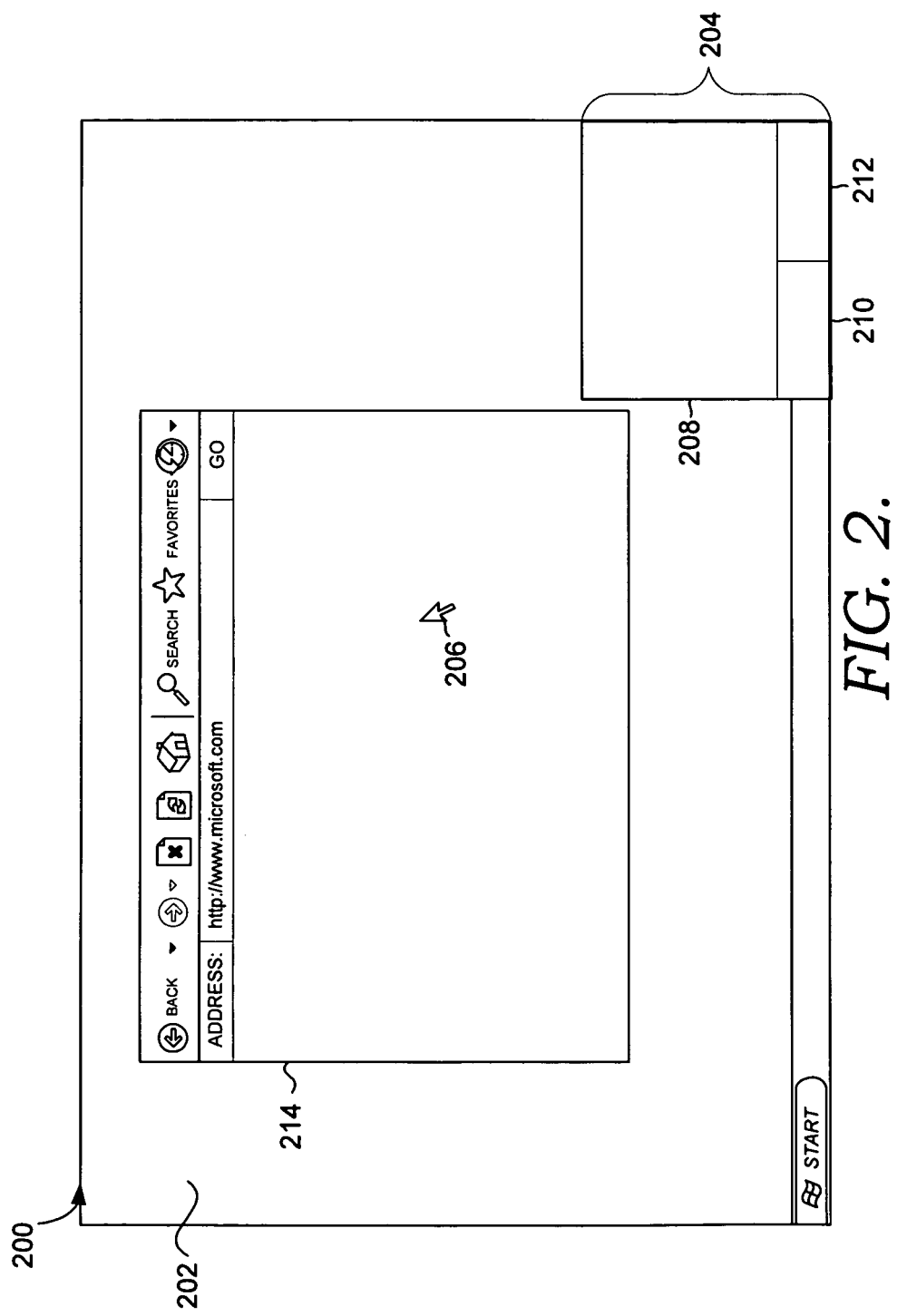
FIG. 2 is a diagram illustrating an exemplary GUI on a touch-screen device in accordance with an embodiment of the invention.

FIG. 2 is a diagram illustrating an exemplary GUI 200 on a touch-screen device in accordance with an embodiment of the invention. The GUI 200 contains two display portions: a system portion 202 and a touch-screen portion 204. Specifically, the system portion 202 presents a GUI of an OS, such as Microsoft Windows®. Touches in the touch-screen portion 204 get translated into actions for a mouse cursor 206 within the system portion 202. In one embodiment, the entire screen, including both the system portion 202 and the touch-screen portion 204, may be included within a touch screen that has been configured to ignore touches in the system portion 202 and process touches in the touch-screen portion 204.

In an alternative embodiment, touches in the system portion 202 are not ignored; rather, touches are processed, allowing a user to directly manipulate the mouse cursor. For example, the user may touch the mouse cursor in the system portion and slide a finger touching the mouse cursor anywhere in the system portion 204. This would result in the mouse following the finger until the finger is lifted. This embodiment would therefore process touches directly in the system portion 202 in addition to touches in the touch-screen portion 204.

The system portion 202 displays software can interact with using a mouse or other input device. In one embodiment, the system portion 202 presents a GUI of an OS, such as Windows®, Windows Mobile®, MacOS, Linux, or the like. Using the mouse, the user can interact with software applications, such as web browser 214.

The touch-screen portion 204 includes a trackpad 208, left button 210, and right button 212. The trackpad 208 represents a normal trackpad portion of a touchpad and allows the user to treat the trackpad 208 in the same manner. Using the trackpad 208, the user can move the mouse cursor in any particular direction 206 by sliding a finger or stylus that direction. More complicated touches (e.g., dragging, dropping, hovering, multi-touch, etc.) may also be registered by touching the trackpad and/or buttons in a particular. For instance, the user may slide a finger downward in the leftmost portion of the trackpad 208 to indicate a scroll down. Or the user may tap the touchpad 208 twice in succession to indicate a click of the left mouse button. Furthermore, touches of the left button 210 and the right button 212 designate left and right button mouse clicks, respectively. Other touches are also possible and will be apparent to one of skill in the art. Moreover, other input devices (e.g., track ball, scroll wheel, etc.) may alternatively employ different actions that can easily be processed by the gesture software described herein.

Embodiments are not limited to the configuration depicted in FIG. 2. For instance, additional buttons may be displayed, or the touch-screen portion may be positioned in another portion of GUI 200. Furthermore, the touch-screen portion 204 may be separated into disparate sections, and the different sections may occupy separate portions of GUI 200.

The line between the touch-screen portion 204 and the system portion 202 may be elminated, in some embodiments, depending on the user interaction. In an embodiment alternative to those described above, touches originating in the touch-screen portion 204 and carrying over to the system portion 202 are processed in their entirety. For example, this embodiment keeps tracking a drag of a finger from the touch-screen portion 204 into the system portion 202. Instead of stopping movement of a cursor 206 when the finger transcends an outer boundary of the touch-screen portion 204, the cursor 206 continues in the direction the finger is being dragged until a specific event—e.g., the user stops the drag. In other words, such an embodiment would not restrict touches to the touch-screen portion 204 when touch carries into the system portion. Moreover, in one embodiment, any touch starting within the touch-screen portion 204 and continuing outside thereof results in the touch being treated as being within the touch-screen portion 204.

Figure 3:
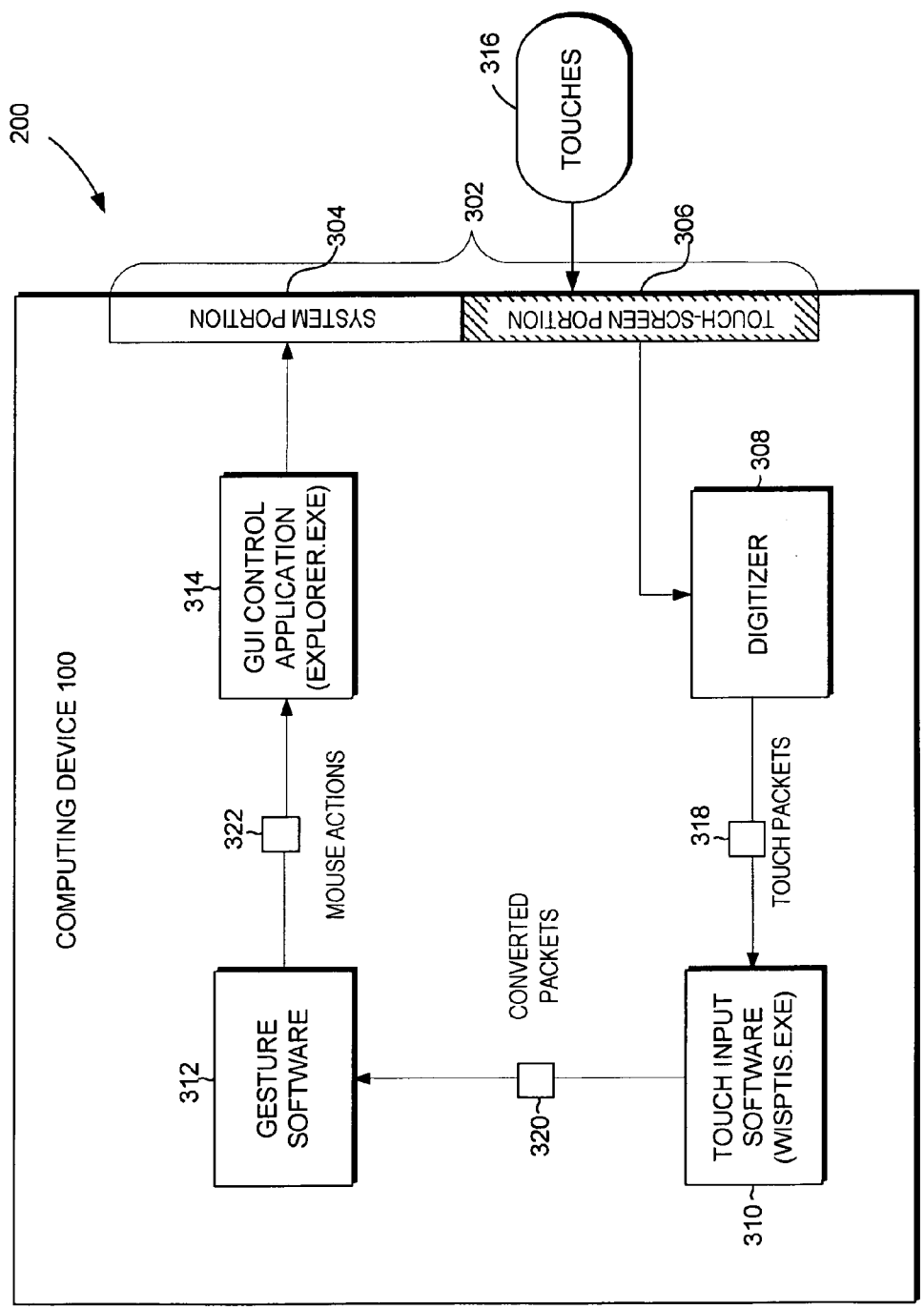
FIG. 3 is a schematic diagram of a touch-screen device configured to present a virtual touchpad in accordance with an embodiment of the invention.

FIG. 3 is a schematic diagram of a touch-screen device 300 configured to present a virtual touchpad in accordance with an embodiment of the invention. It should be noted that FIG. 3 merely illustrates one embodiment. Also, numerous components of computing device 100 are not illustrated for the sake of clarity. Indeed, the computing device 100 includes a processor and computer-storage media to support the software referenced herein. In fact, touch packets 318, mouse messages 320, or mouse actions 322 may be cached for quick retrieval in some embodiments.

The touch-screen device 300 is a computing device that may contain any of the hardware and software described herein. The touch-screen device 300 includes a display 302, digitizer 308, touch input software 310, gesture software 312, and GUI control application 314. In one embodiment, the touch-screen portion 306 is displayed at the discretion of the user. The user may select a hard or soft key to show the touch-screen portion 306. When not shown, the display area 302 is only configured with the system portion 304. Other embodiments may include additional software and hardware not illustrated in FIG. 2.

The display 302 is a single presentation screen with touch-screen capabilities. In one embodiment, software on the computing device 100 simultaneously presents two different GUI portions on the display 302. These portions are illustrated in FIG. 2 and referenced above as a system portion 304 and a touch-screen portion 302. The system portion 304 displays an interactive presentation of an operating system (OS), thus providing access to software applications. By way of example, the system portion 304 can be thought of as a portion of the display 302 displaying a version of Microsoft Windows®, Windows Mobile®, Linux, MacOS, or the like. Within the system portion 304, a user can interact with software applications by manipulating a mouse cursor. Furthermore, the touch-screen portion 306 displays a virtual touch-pad that a user can use to control the mouse cursor. The virtual touchpad receives touches 316 from the user (e.g., with a finger or sylus) and translates the touches 316 into commands for moving the mouse cursor in the system portion 304. Put succinctly, the user touches the touchpad in the touch-screen portion 306 to control the mouse cursor in the system portion 304.

The user may input various touches 316 on the touch-screen portion 306. For instance, the user may drag a finger across the touch-screen portion 306 in one direction to instruction the cursor to move in that direction. Right, left, middle, or other buttons may be tapped with a finger or stylus signifying a press of one of the buttons. These buttons may also have a "sticky" feature, whereby an action (e.g., a button-down command quickly followed by a down drag) results in the buttons being held in the down position until a release action (e.g., single tap of a button down) is registered. Of course, various other touches 316 may be received by the touch-screen portion 306.

Touches 316 received by the touch-screen portion 306 are funneled through a digitizer 308. In one embodiment, the digitizer 308 includes a touch-screen driver that detects touches 316 received by the touch-screen portion 306 and converts the touches 316 into their digital equivalents. By way of example but not limitation, the digitizer 308 may be configured to detect changes in current, voltage, resistance, capacitance, or infrared light resulting from touches 316. The digitizer 308 converts the changes into touch packets 318.

Touch packets 318 (commonly referred to as "pen and touch packets") include various information related to the touches 316, such as: x/y coordinates, pressure, size, direction, or the like. Additionally, the packets may also include information associated with the touch-screen capabilities of the display 302—such as the dimensions of the touch-screen portion 306 (e.g., two inches by two inches, 200 pixels, etc.).

The touch input software 310 converts the touch packets 318 to fit the screen portion 304. To do so, the touch input software 310 translates the information provided in the touch packets 318 into their equivalents on the system portion 304. The touch input software 310 may include any type of shell program, such as WISPTIS in Microsoft Windows®. In operation, the touch input software 310 takes the information in the touch packets 318 and converts them to fit the screen size, resolution, or number of pixels of the display 302.

In operation, the touch input software 310 converts the information in the touch packets 318 from the display size or resolution of the touch-screen portion 306 into the screen size and resolution associated with the underlying screen of the display 302. For example, the touch screen portion 306 may be two inches wide by two inches long, and the display 302 may be ten inches wide by ten inches long. To convert the touch packets 318, the touch input software 310 multiplies, in one embodiment, the distance a finger moved on the touch-screen portion 306 by a factor of five. Furthermore, the speed of a touch may also be translated to indicate a speed with which to move a mouse cursor.

The touch-screen capabilities of the display 302 may be more precise than the resolution of the display 302. For example, the display 302 may include a computer screen capable of illuminating 200 lines of pixels and a touch-screen layer (e.g., capacitive, resistive, infrared) with over 10,000 lines of detectable space. In this example, detections by the digitizer 308 may be translated into their display equivalents in the system portion 304, thus allowing the touches 316 to be rendered in the system portion 304.

Once the touch packets 318 are converted by the touch input software 310 for presentation on the display or within the display area of the system portion 304, the converted packets 320 are fed through gesture software 312 to determine what actions were specified by the touches 316. In one embodiment, the gesture software 312 implements a state machine where mouse actions 322 are determined based on various rules. The rules implemented by the gesture software 312 may include any condition associated with a mouse action. For example, when converted packets 320 indicate a detected movement in a particular direction at a particular speed, gesture software 312 determine that the mouse is supposed to move in the direction at the speed, and a mouse packet 322 is created accordingly. Rules can be set up for nearly any type of mouse action, such as hover, drag, multi-touch, and the like.

Mouse actions 322 may be linear or non-linear translations of the touches 316. Linear translations are direct translations of touches 316 to the system portion 304, accounting for the differences in screen sizes of the touch-screen portion 306 compared with the display area of the touch-screen portion 306 or the display 302. In other words, the speed of a touch 316 is translated into its equivalent on the system portion 304. A non-linear translation refers to a touch that is not directly translated to the system portion; rather, the touch is amplified or otherwise manipulated based on a rule. For example, the speed a finger is swiped across the touch-screen portion 306 may be accelerated if it is continuously moving in the same direction for a particular time. Or a swipe of a virtual nub at a particular speed may amplify the speed the mouse cursor is moved. Rules can be specified in the gesture software 312 to account for either linear or non-linear movements.

Rules for the gesture software 312 may account for multi-touch gestures. For example, an item drag may be performed by holding a touch on a left virtual mouse button while sliding a finger across the virtual touchpad. To account for such an action, as well as other multi-touch actions, a rule may be set up and executed by the gesture software 312.

Mouse actions 322 are passed to the GUI control application 314 for presentation. The GUI control application 314 is a shell program capable of interpreting mouse actions and executing the actions with a mouse cursor. In operation, the GUI control application 314 controls the mouse cursor on the system portion 304. In one embodiment, the GUI control application 314 is the explorer.exe application program in the Windows® OS. Alternative embodiments may incorporate different application programs for controlling mouse cursors in other OSs.

In one embodiment, the gesture software 306 contains rules for processing touch packets 318 within the tough-screen portion 306 but not touch packets 318 within the system portion 304. So when a user drags a finger beyond the boundary of the touchpad, touch packets 318 beyond the touch-screen portion 306 are not processed—which, in practice, stops the movement of a mouse. In an alternative embodiment, however, mouse messages originating from within the touch-screen portion 306 and extending to the system portion 304 are processed in their entirety. In this embodiment, a touch starting on the virtual touchpad and moving into the display of the OS will generate mouse actions 322 to continuously move the mouse cursor until the touch is completed outside of the system portion 304. Thus, using the touch-screen properties supported on the entire display 302, the user is not necessarily bound to the virtual touchpad.

Figure 4:
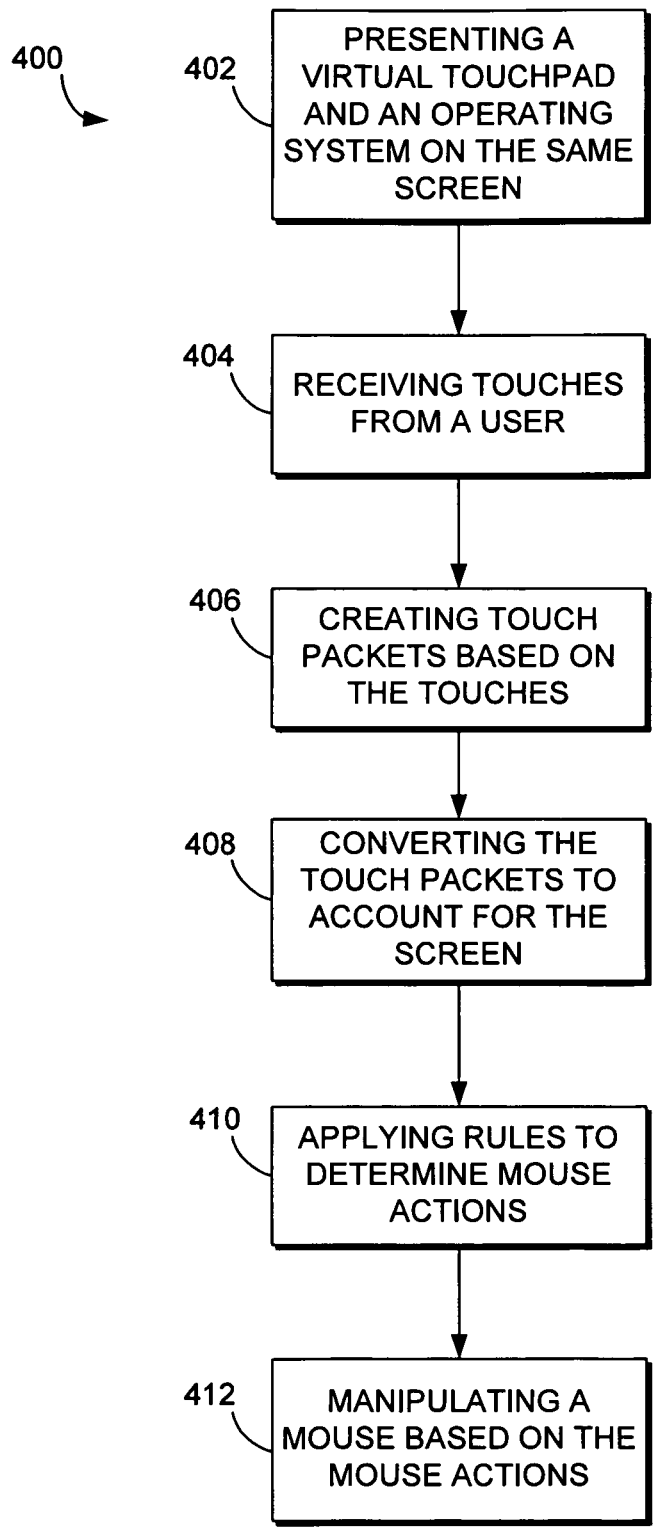
FIG. 4 is a diagram of a flow chart illustrating steps for presenting and managing a virtual touchpad in accordance with an embodiment of the invention.

FIG. 4 is a diagram of a flow chart 400 illustrating steps for presenting and managing a virtual touchpad and a GUI of an operating system in the same display in accordance with an embodiment of the invention. Initially, a single touch-screen display simultaneously presents the virtual touchpad and the operating system, as indicated at 402. In one embodiment, only the GUI of the OS is presented until the user selects a hard or soft key to view the virtual touchpad. In another embodiment, the virtual touchpad is presented without any user interaction.

The user may touch the virtual touchpad in order to interact with the OS, such as moving a mouse cursor, as indicated at 404. Touches from the user are read by a digitizer, which creates touch packets, as indicated at 406. Touch packets are digital representations of the touches from the user. Because the touch-screen may be able to register touches with a certain precision and display information with another, the touch packets are converted to fit the display configurations of the touch-screen display, as indicated at 408. For example, the touch packets may be converted to fit a particular screen size or resolution of the touch-screen display or to fit a system portion being displayed simultaneously with the virtual touchpad.

As indicated at 410, rules are applied to the converted packets to determine what mouse actions were intended by the touches, as indicated at 410. These rules may encompass actions a user enteres on the virtual pad, such as movement of the mouse, button down, button up, drag, hover, multi-touch, or the like. Once determined, the mouse actions are fed to an application program (e.g., explorer.exe in Windows®), which then manipulates the GUI of the OS accordingly.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. One or more computer-storage media having computer-executable instructions embodied thereon for performing a method for simultaneously displaying a virtual touchpad for controlling a mouse cursor based on touches on the touchpad, the method comprising:
   on a touch screen, simultaneously presenting a system portion and a touch-screen portion;
   presenting a user interface (UI) of an operating system (OS) in the system portion of the touch screen, wherein the mouse cursor is presented as part of the OS;
   presenting the virtual touchpad in the touch-screen portion of the touch screen for controlling the mouse cursor, wherein the virtual touchpad is presented on the user interface and includes an area for controlling movements of the mouse cursor;
   receiving touches within the touch-screen portion of the touch screen;
   using one or more rules to translate the touches into one or more mouse actions;
   using the mouse actions to control the mouse cursor;
   receiving a touch that originates from within the touch-screen portion of the touch screen and, while maintaining contact with the touch screen, continues into the system portion of the touch screen by going outside of a boundary of the touch-screen portion;
   using the one or more rules to process the touch that originates from within the touch-screen portion of the touch screen and, while maintaining contact with the touch screen, continues into the system portion of the touch screen by going outside of the boundary of the touch-screen portion.

2. The media of claim 1, further comprising applying a digitizer to the touches to convert the touches into touch packets.

3. The media of claim 2, wherein the touch packets comprise indications of at least one of x/y coordinates, direction, and speed associated with the touches.

4. The media of claim 1, further comprising presenting one or more virtual buttons in the touch-screen portion.

5. The media of claim 1, further comprising receiving the touches in a portion of the system portion.

6. The media of claim 1, wherein the touch is made by a user's finger or a stylus.

7. The media of claim 1, wherein the one or more rules do not process touches originating from outside of the touch-screen portion.

8. The media of claim 1, wherein the virtual touchpad is only presented when a user presses a key.

9. The media of claim 1, wherein the touch screen supports multi-touch touches.

10. A method for presenting a virtual touchpad on a display so a user can interact with a graphical user interface (GUI) representation of an operating system (OS), the method comprising:

on a display, simultaneously presenting a system portion and a touch-screen portion, wherein the system portion presents the GUI of the OS, and the touch-screen portion presents the virtual touchpad on the GUI in a representation indicative of a virtualized mouse touchpad including an area for receiving touches to control movements of a mouse cursor;

receiving one or more touches on the virtual touchpad;

receiving one or more touches that originate from within the touch-screen portion and, while maintaining contact with the display, continue into the system portion by going outside of a boundary of the touch-screen portion;

translating the one or more touches into touch packets that indicate an x/y direction;

converting the touch packets into converted packets that account for a screen size associated with the system portion;

determining one or more mouse actions based on the converted packets; and manipulating the GUI of the OS based on the mouse packets.

11. The method of claim 10, further comprising caching the converted packets.

12. The method of claim 11, wherein the touch is made by a user's finger or a stylus.

13. The method of claim 11, wherein manipulating the GUI of the OS further comprises manipulating a mouse cursor.

14. The method of claim 13, wherein the mouse cursor is controlled by an application program.

\* \* \* \* \*